US012662092B2

(12) United States Patent
Moline

(10) Patent No.: US 12,662,092 B2
(45) Date of Patent: Jun. 23, 2026

(54) HEAT SHIELD ASSEMBLY

(71) Applicant: SAFRAN LANDING SYSTEMS,
Velizy-Villacoublay (FR)

(72) Inventor: Sylvain Moline, Moissy-Cramayel (FR)

(73) Assignee: SAFRAN LANDING SYSTEMS,
Velizy-Villacoublay (FR)

( * ) Notice: Subject to any disclaimer, the term of this
patent is extended or adjusted under 35
U.S.C. 154(b) by 502 days.

(21) Appl. No.: 18/006,233

(22) PCT Filed: Jul. 20, 2021

(86) PCT No.: PCT/EP2021/070308
§ 371 (c)(1),
(2) Date: Jan. 20, 2023

(87) PCT Pub. No.: WO2022/018103
PCT Pub. Date: Jan. 27, 2022

(65) Prior Publication Data
US 2023/0294646 A1     Sep. 21, 2023

(30) Foreign Application Priority Data
Jul. 21, 2020     (FR) ..................................... 2007663

(51) Int. Cl.
*B60T 5/00*     (2006.01)
*B60B 27/00*     (2006.01)
(52) U.S. Cl.
CPC ............ *B60T 5/00* (2013.01); *B60B 27/0047*
(2013.01); *B60B 2900/513* (2013.01); *B60Y*
*2200/50* (2013.01)

(58) Field of Classification Search
CPC . B60T 5/00; B60B 27/0047; B60B 2900/513;
B60B 27/0052; B60Y 2200/50; F16D
65/847; F16D 2065/785
See application file for complete search history.

(56) References Cited

U.S. PATENT DOCUMENTS 4,084,857 A     4/1978 VanderVeen
8,157,062 B2 *     4/2012 Enright ................... F16D 65/78
188/71.6

(Continued)

FOREIGN PATENT DOCUMENTS

CN     106763353 A     5/2017
EP     2 687 742 A1     1/2014
WO     2009/082397 A1     7/2009

OTHER PUBLICATIONS

Chinese Patent No. CN 107628236 to Ramond et al published on
Jan. 26, 2018.*

(Continued)

*Primary Examiner* — Pamela Rodriguez
(74) *Attorney, Agent, or Firm* — Christensen O'Connor
Johnson Kindness PLLC

(57) ABSTRACT
A heat shield assembly for a braked aircraft wheel is
provided. The heat shield assembly includes a heat shield
and at least one spacer having both a main body projecting
from an outwardly-facing surface of the heat shield and a
clamping element of generally cylindrical shape projecting
from the body and passing perpendicularly through an
opening in the heat shield. The clamping element can
include an enlarged free end so as to co-operate with the
body to form an annular groove engaged with the opening in
the heat shield.

8 Claims, 4 Drawing Sheets

(56)            References Cited

U.S. PATENT DOCUMENTS

| | | | |
|---|---|---|---|
| 2017/0326911 A1 * | 11/2017 | Darsy | .................. B60B 25/008 |
| 2024/0043114 A1 * | 2/2024 | Moline | .................. B64C 25/36 |

OTHER PUBLICATIONS

European Patent No. EP 3712061 to Francis et al published on Oct. 19, 2022.*

European Patent No. EP 1516754 to Thorp et al published on Mar. 23, 2005.*

French Patent No. FR 3126962 to Moline et al published on Mar. 17, 2023.*

International Search Report mailed Sep. 24, 2021, issued in corresponding International Application No. PCT/EP2021/070308, filed Jul. 20, 2021, 6 pages.

Written Opinion mailed Sep. 24, 2021, issued in corresponding International Application No. PCT/EP2021/070308, filed Jul. 20, 2021, 5 pages.

* cited by examiner

HEAT SHIELD ASSEMBLY

CROSS-REFERENCES TO RELATED APPLICATIONS

This application is a National Stage of International Application No. PCT/EP2021/070308, filed Jul. 20, 2021, which claims priority to French Patent Application No. 2007663, filed Jul. 21, 2020, the entire disclosures of which are hereby incorporated by reference in their entirety for all purposes.

TECHNICAL FIELD

Embodiments of the disclosure relate to a heat shield for a braked aircraft wheel fitted with spacers for preventing any contact between the wheel and the heat shield, in particular while the wheel is rotating.

BACKGROUND

A main aircraft landing gear wheel is generally provided with a brake made up of a stack of disks comprising rotor disks alternating with stator disks and housed inside the rim of the wheel. The amount of heat given off as a result of the disks rubbing against one another during braking can be considerable, and it is known to provide a wheel rim with a heat shield that is interposed between the inwardly-facing surface of the rim and the disks in order to protect the rim and the tire carried by the rim from this influx of heat. The heat shield is generally constituted by a plurality of very thin metal sheets separated by thin layers of air.

While the wheel is rotating, the heat shield is subjected to large tangential and inertial forces that can give rise to contact between the heat shield and the wheel. Such contact can be harmful to the rim, which has its inwardly-facing surface covered in paint, and this applies in particular in the event of repeated contacts that can end up oxidizing the rim and thus degrading its mechanical properties.

It is known to fit the heat shield with studs (also known as "spacers") that are made of polymer material in order to prevent any contact between the heat shield and the rim. Such a stud generally comprises a base provided with an annular groove that is arranged to engage with the peripheral edge of a circular opening in the heat shield.

Although such studs are found to be effective, they are also found to be particularly difficult to insert into the openings in the heat shield, and they require operators to make use of a special tool for deforming the bases of the studs so as to enable them to be inserted into the openings in the heat shield. Furthermore, if the tool is not used properly, it can damage the stud and degrade its retention by the heat shield.

Document EP 2 687 742 discloses a heat shield including an opening of key-hole shape into which there is inserted a stud that is rectangular in shape. Although there is no need to use such a special tool for inserting such a stud in the heat shield, its elongate shape can prevent it from being installed in a restricted space and makes it difficult to obtain point contact with the heat shield. Furthermore, a long stud requires a large opening, which has the effect of reducing the stiffness of the heat shield and also of reducing the thermal protection that it provides.

SUMMARY

Embodiments of the present disclosure include a heat shield assembly expected to address at least some of the above-noted issues with the current technology.

To this end, there is provided a heat shield assembly for a braked aircraft wheel, the assembly comprising a heat shield and at least one spacer. The spacer comprises both a main body projecting from an outwardly-facing surface of the heat shield and also at least one clamping element of generally cylindrical shape projecting from the body and passing perpendicularly through an opening in the heat shield. The clamping element has an enlarged free end so as to co-operate with the body to form an annular groove engaged with the peripheral edge of the opening in the heat shield.

According to the disclosure, the opening has the shape of a drop of water.

An opening of that shape enables the spacer to be put into place on the heat shield without a special tool. It is also easier to put the spacer into place, and maintenance times are shortened.

In a particular embodiment of the disclosure, the peripheral edge of the opening comprises both a larger-diameter circular portion and a smaller-diameter circular portion, which portions are connected together by two identical rectilinear portions.

In particular manner, the opening has a length that is substantially equal to the diameter of the enlarged free end in the clamping element.

In particular manner, the larger-diameter circular portion of the opening is of diameter substantially equal to the diameter of the bottom of the groove of the spacer.

In particular manner, the groove is of thickness greater than or equal to the thickness of the heat shield.

According to a particular characteristic, the body of the spacer comprises a cylindrical portion having one end from which the clamping element projects along the axis of the cylindrical portion and an opposite end that is free and covered by a spherical cap.

According to another particular characteristic, the heat shield includes two openings, and the spacer includes two clamping elements, the body of the spacer being elongate in shape and having two ends, each of which ends is provided with a respective one of the clamping elements cooperating with a respective one of the openings in the heat shield.

In particular manner, the openings in the heat shield present a common longitudinal axis of symmetry and they point towards each other.

DESCRIPTION OF THE DRAWINGS

The disclosure can be better understood in the light of the following description, which is purely illustrative and non-limiting, and which should be read with reference to the accompanying drawings, in which.

DETAILED DESCRIPTION

Figures 1, 2:
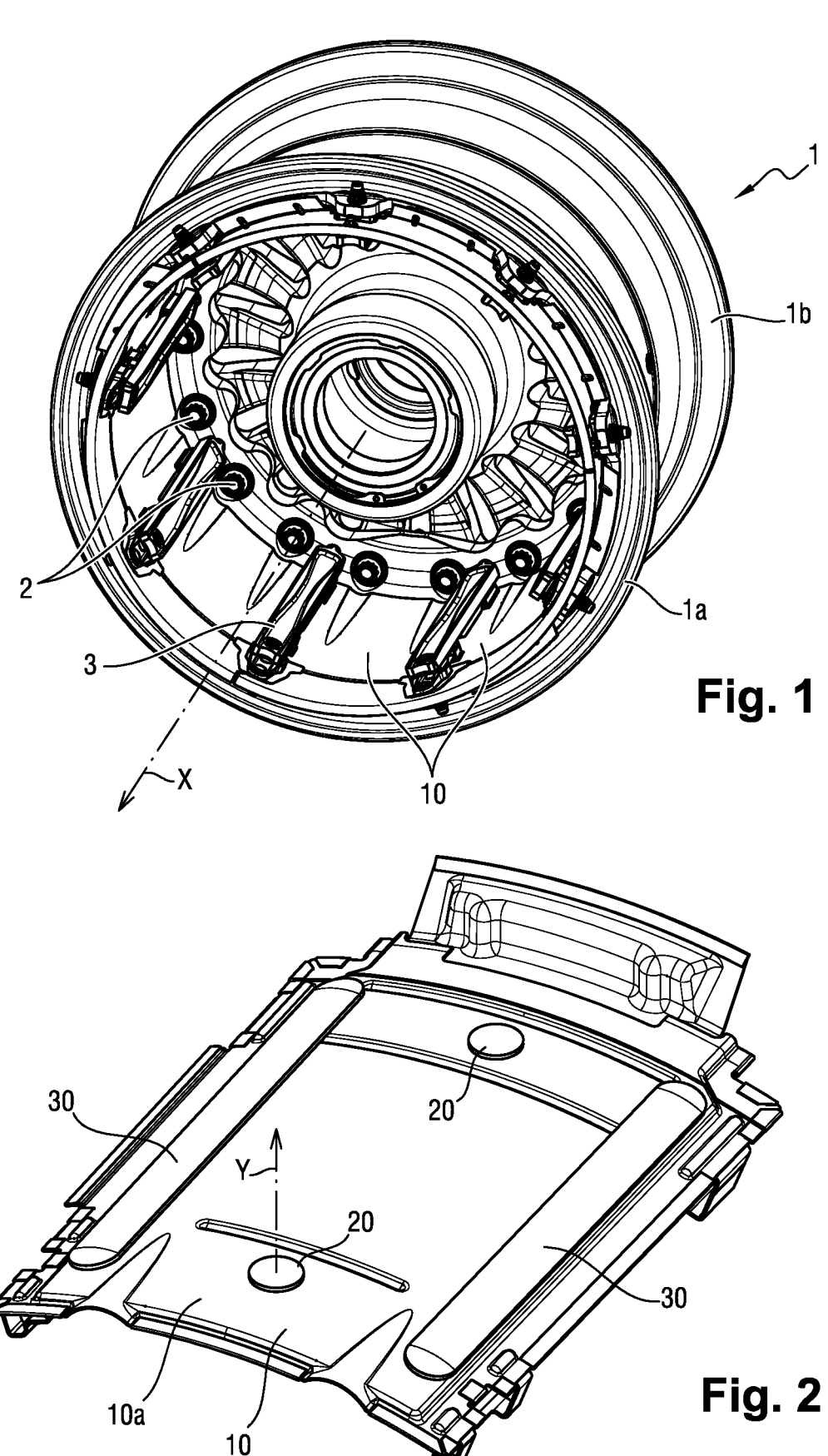
FIG. 1 is a perspective view of a braked aircraft wheel fitted with heat shield assemblies in a particular embodiment of the disclosure.
FIG. 2 is a perspective view of one of the heat shield assemblies fitted to the aircraft wheel shown in FIG. 1.

With reference to FIG. 1, the disclosure is applied to an aircraft wheel 1, which in this example comprises two half-rims 1*a* and 1*b* that are connected together by bolts 2 in order to carry a tire (not shown). The wheel 1 is provided with ballbearings for mounting it on an aircraft landing gear axle to rotate about an axis of rotation X. The half-rim 1*a* is hollow and receives the disks of a brake, comprising both rotor disks that are driven in rotation about the axis of rotation X of the wheel 1 by bars 3 secured to an inwardly-facing cylindrical surface of the half-rim 1*a*, and also stator disks that are engaged on a braking torque take-up tube (not shown) that prevents them from rotating with the wheel 1. A heat shield, which in this example is made up of a plurality of identical heat shields 10 each extending between two bars, is arranged between the half-rim 1*a* and the disks in order to protect the wheel 1 from radiation given off by the disks when hot. This is all well known, and is recalled merely to situate the disclosure.

In accordance with to the disclosure, the heat shield 10 is fitted with spacers 20 and 30 that are made of polymer material and that project from a face 10*a* of the heat shield 10 facing towards the inwardly-facing surface of the half-rim 1*a* in order to prevent any contact between the heat shield 10 and the half-rim 1*a*.

With reference to FIG. 2, there can be seen two different types of spacer: spacers 20 of generally cylindrical shape and referred to as "short studs" that serve to provide potential point contact with the inwardly-facing of the half-rim 1*a*, and spacers 30 of long shape and referred to as "long studs" that serve to provide potential linear contact with the inwardly-facing surface of the half-rim 1*a*.

The heat shield 10 is fitted with two long studs 30, each extending along a respective longitudinal edge of the heat shield 10, and with two short studs 20 that are arranged between the long studs 30, one of them being arranged between the proximal ends of the long studs 30 and the other between the distal ends of the long studs 30.

Figure 4:
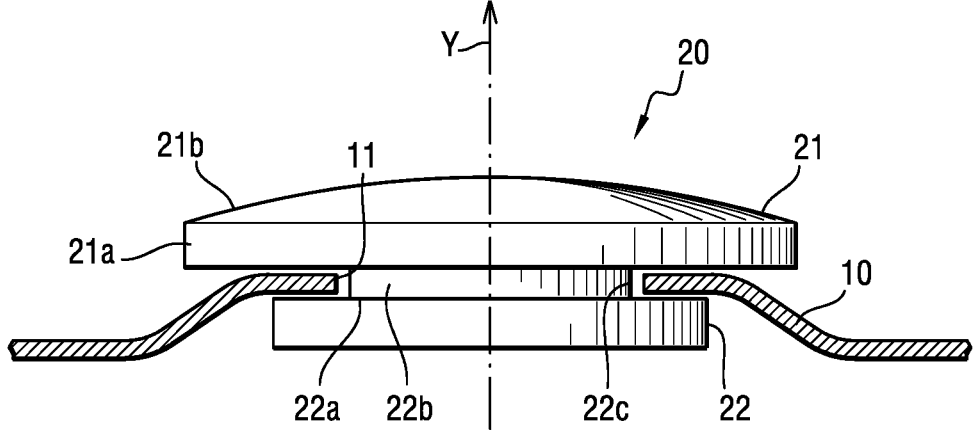
FIG. 4 is an axial section view of a spacer of the assembly shown in FIG. 2.

Each of the short studs 20 comprises a main body 21 projecting from the face of the heat shield 10 that faces towards the inwardly-facing surface of the half-rim 1*a*, extending along an axis Y orthogonal to the face of the heat shield 10 (FIG. 4). The body 21 comprises a cylindrical portion 21*a* forming a disk about the axis Y with a free face that is covered by a spherical cap 21*b* in order to make it possible to generate point contact with the inwardly-facing surface of the half-rim 1*a*.

Each of the short studs 20 also comprises a clamping element 22 extending along the axis Y in line with the body 21 and passing through an opening 11 in the heat shield 10. The clamping element 22 comprises a retaining disk 22*a* about the axis Y that projects from a face of the heat shield facing towards the axis of rotation X of the wheel 1. The retaining disk 22*a* is of diameter that is slightly smaller than the diameter of the body 21 and it is connected to the body 21 via a linking disk 22*b* about the same axis as the retaining disk 22*a* and the body 21. The linking disk 22*b* is of diameter smaller than the diameters of the retaining disk 22*a* and of the body 21, so as to co-operate with the retaining disk 22*a* and the body 21 to form an annular groove 22*c* engaged with the peripheral edge of the opening 11 in the heat shield 10. The linking disk 22*b* is of thickness greater than or equal to the thickness of the opening 11.

Figure 3:
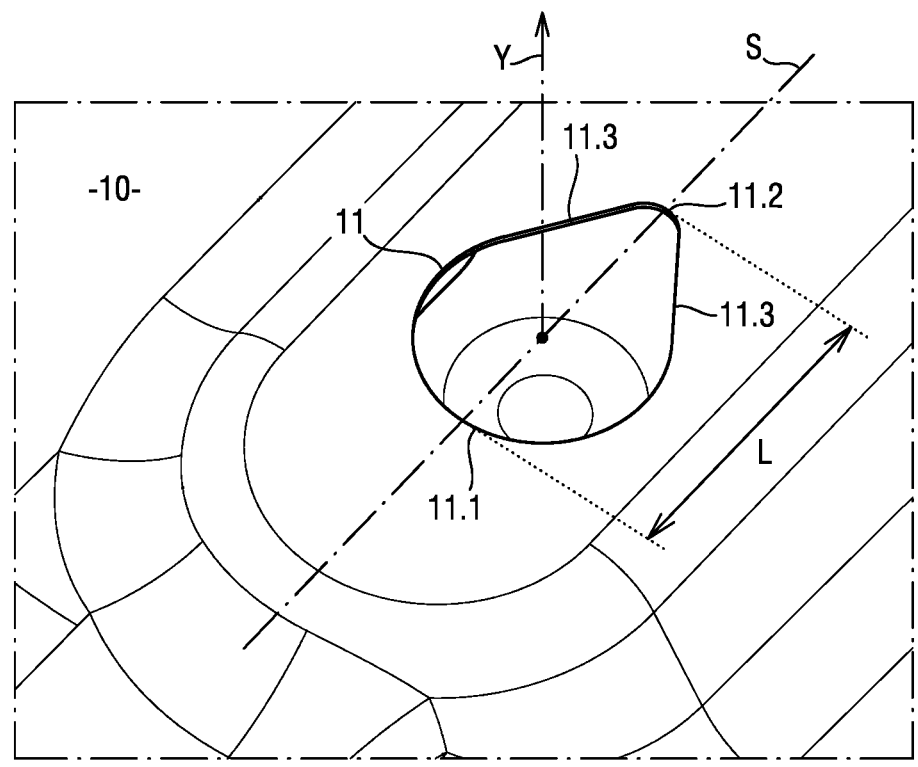
FIG. 3 is a detail view of an opening in the heat shield shown in FIG. 2.

With reference to FIGS. 3 and 4, the opening 11 is in the shape of a drop of water, and its peripheral edge has a first circular portion 11.1 of diameter substantially equal to the diameter of the linking disk 22*b* of the clamping element 22 and centered on the axis Y, and a second circular portion 11.2 of diameter smaller than the diameter of the first circular portion 11.1 and greater than or equal to the thickness of the retaining disk 22*a*. By way of example, the diameter of the second circular portion 11.2 and the thickness of the retaining disk 22*a* are equal respectively to three millimeters and to two millimeters. Respectively, the circular portions 11.1 and 11.2 form first and second ends of the opening 11, and they are connected together by rectilinear portions 11.3 of identical length. The ends of the rectilinear portions 11.3 are substantially tangential to the ends of the circular portions 11.1 and 11.2.

The opening 11 has an axis of symmetry S passing through the middles of the circular portions 11.1 and 11.2, and intersecting the axis Y. The middles of the circular portions are spaced apart by a distance that is substantially equal to the diameter of the retaining disk 22*a* of the clamping element 22 and they define the length L of the opening 11.

Figure 5B:
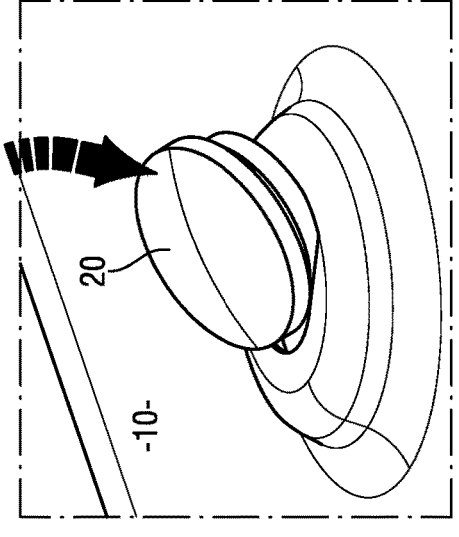
FIG. 5B shows a second step of placing the spacer.
Figure 5D:
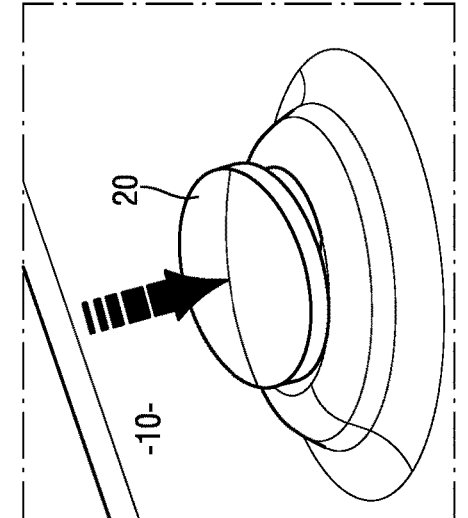
FIG. 5D shows a fourth step of placing the spacer.
Figure 5A:
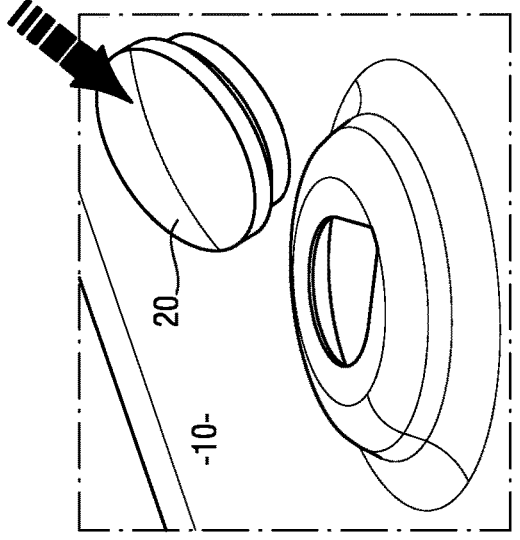
FIG. 5A shows a first step of placing a spacer in the opening shown in FIG. 4.
Figure 5C:
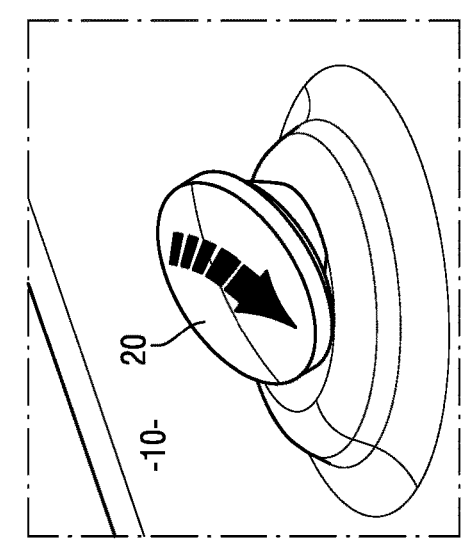
FIG. 5C shows a third step of placing the spacer.

In order to put the short stud 20 into place in the opening 11, the short stud 20 is initially tilted at an angle of about 45° relative to the face of the heat shield 10 that faces towards the inwardly-facing surface of the half-rim 1*a* (FIG. 5A), and it is then moved up to the opening in order to insert the retaining disk 22*a* into the length L of the opening 11 so that the groove 22*c* becomes partially engaged with one of the ends of the circular portion 11.1 (FIG. 5B). Manual pressure is then exerted on the spherical portion 21*b* of the short stud 20 so as to deform the polymer material until the retaining disk 22*a* has passed fully through the opening 11 and the linking disk 22*b* co-operates with the opening 11 (FIG. 5C).

Figure 6:
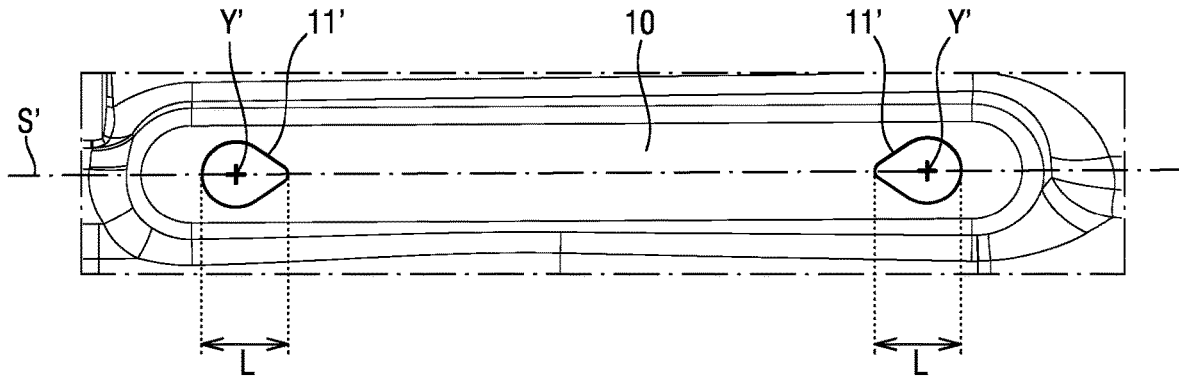
FIG. 6 is a detail view of two oppositely-arranged openings in the heat shield shown in FIG. 2.
Figure 7:
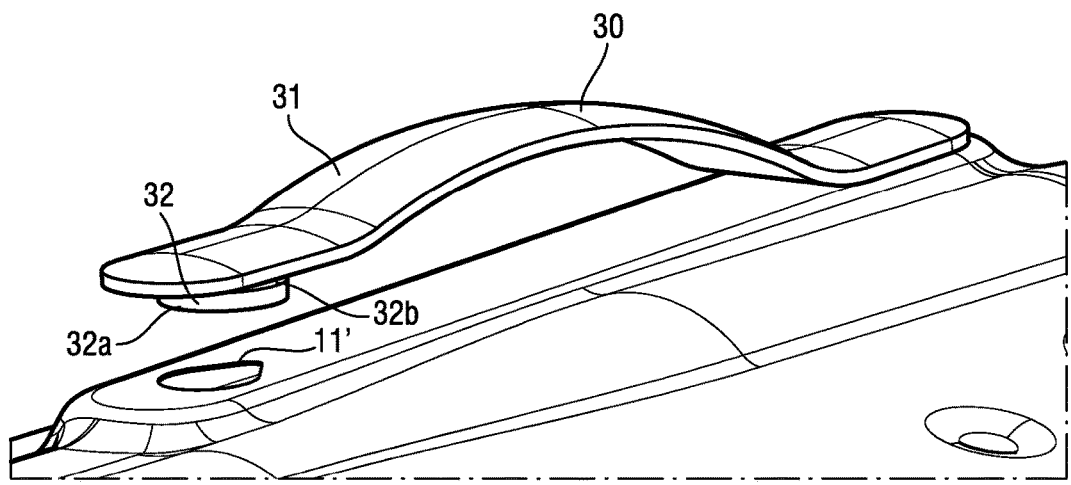
FIG. 7 is a view showing a spacer being placed in the openings shown in FIG. 6.

With reference to FIGS. 6 and 7, each of the long studs 30 comprises a main body 31 of elongate shape that projects from the face of the heat shield 10 facing towards the inwardly-facing surface of the half-rim 1*a*, the stud projecting along an axis Y' that is orthogonal to the face of the heat shield 10. When looking along the axis Y', the body 31 is in the shape of a rectangle provided with two semicircular ends. The body has a free face that bulges in order to make it possible to provide linear contact with the inwardly-facing surface of the half-rim 1*a*, and in this example contact that is rectilinear.

At each end of its body 31, each of the long studs 30 also has a clamping element 32 extending along the axis Y' and passing through a respective opening 11' in the heat shield 10 that is identical to the opening 11. The clamping elements 32 of the long studs 30 are identical to the clamping elements 22 of the short studs 20, each comprising a retaining disk 32*a* and a linking desk 32*b* engaging with a respective opening 11'.

It should be observed that the two openings 11' in which the long studs 30 are inserted are oppositely arranged, pointing towards each other so that they present a common axis of symmetry S' with their smaller-diameter circular portions facing each other.

In order to put a long stud 30 into place on the heat shield 10, one of the clamping elements 32 is inserted initially in one of the openings 11', and then the long stud 30 is pulled a little so as to take advantage of the deformation of the polymer material in order to place the other clamping element 32 in the other opening 11'.

Naturally, the disclosure is not limited to the embodiments described, but covers any variant coming within the ambit of the disclosure as defined by the claims.

The spacers 20 and 30 may be made of any suitable material (silicone, synthetic polymer material, natural rubber, synthetic rubber, . . . ).

The spacers 20 and 30 may be manufactured by any suitable manufacturing method (injection molding, . . . ).

The openings 11 and 11' may be cut out directly in the heat shield 10 (cutting by waterjet, by laser, . . . ), or they may be formed by punching.

The studs 20 and 30 and the openings 11 and 11' may be arranged differently from the arrangements shown in FIGS. 1 to 7.

The numbers of studs 20 and 30, the shapes of their bodies 21 and 31, and their dimensions may be different those shown in FIGS. 1 to 7.

The invention claimed is:

1. A heat shield assembly for a braked aircraft wheel, the heat shield assembly comprising:
    a heat shield; and
    at least one spacer comprising:
        a main body projecting from an outwardly-facing surface of the heat shield; and
        a clamping element of generally cylindrical shape projecting from the main body and passing perpendicularly through an opening in the heat shield, the clamping element having an enlarged free end so as to co-operate with the main body to form an annular groove engaged with a peripheral edge of the opening in the heat shield,
    wherein the opening has the shape of a drop of water, the peripheral edge of the opening includes a larger-diameter circular portion, a smaller-diameter circular portion, and two identical rectilinear portions connecting the larger-diameter circular portion to the smaller-diameter circular portion.

2. The heat shield assembly of claim 1, wherein the opening has a length that is substantially equal to a diameter of the enlarged free end of the clamping element.

3. The heat shield assembly of claim 1, wherein the larger-diameter circular portion of the opening has a diameter substantially equal to a diameter of the bottom of the groove in the spacer.

4. The heat shield assembly of claim 1, wherein the smaller-diameter circular portion of the opening has a diameter greater than or equal to a thickness of the enlarged free end of the clamping element.

5. The heat shield assembly of claim 1, wherein the groove has a thickness greater than or equal to a thickness of the heat shield.

6. The heat shield assembly of claim 1, wherein the main body of the spacer further comprises a cylindrical portion having one end from which the clamping element projects along the axis of the cylindrical portion and an opposite end that is free and covered by a spherical cap.

7. The heat shield assembly of claim 1, wherein the heat shield includes two openings, and the spacer includes two clamping elements, the main body of the spacer being elongate in shape and having two ends, each of which ends is provided with a respective one of the clamping elements cooperating with a respective one of the openings in the heat shield.

8. The heat shield assembly of claim 7, wherein the openings in the heat shield present a common longitudinal axis of symmetry and the openings point towards each other.

* * * * *